United States Patent
Moriguchi et al.

[11] Patent Number: 5,864,110
[45] Date of Patent: Jan. 26, 1999

[54] POWER SUPPLY APPARATUS FOR PLASMA ARC UTILIZING EQUIPMENT

[75] Inventors: Haruo Moriguchi, Itami; Kenzo Danjo, Kyoto-fu; Takashi Hashimoto, Kobe, all of Japan

[73] Assignee: Sansha Electric Manufacturing Company, Limited, Osaka, Japan

[21] Appl. No.: 968,054

[22] Filed: Nov. 10, 1997

[30] Foreign Application Priority Data

Nov. 22, 1996 [JP] Japan .................................. 8-327642

[51] Int. Cl.$^6$ .................................................. B23K 10/00
[52] U.S. Cl. ............................ 219/121.57; 219/121.54; 219/121.48; 363/37; 315/291
[58] Field of Search .......................... 249/12.57, 121.54, 249/121.48, 121.39; 363/34–37, 15, 53, 79, 80, 97; 315/224, 244, 291, 209

[56] References Cited

U.S. PATENT DOCUMENTS

| | | | |
|---|---|---|---|
| 3,668,509 | 6/1972 | Riebs et al. | 361/18 |
| 3,781,638 | 12/1973 | Anderson et al. | 321/14 |
| 4,641,042 | 2/1987 | Miyazawa | 363/34 |
| 5,047,909 | 9/1991 | Hosoda | 363/40 |
| 5,225,658 | 7/1993 | Yamaguchi et al. | 219/121.57 |
| 5,428,267 | 6/1995 | Peil | 3145/224 |
| 5,457,624 | 10/1995 | Hastings | 363/127 |
| 5,465,202 | 11/1995 | Ibori et al. | 363/37 |
| 5,499,154 | 3/1996 | Cullison | 361/18 |
| 5,630,952 | 5/1997 | Karino et al. | |
| 5,643,475 | 7/1997 | Karino et al. | 219/121.57 |

FOREIGN PATENT DOCUMENTS 8-275549  10/1996  Japan .

*Primary Examiner*—Mark H. Paschall
*Attorney, Agent, or Firm*—William H. Murray, Esq.

[57] ABSTRACT

A power supply apparatus for a plasma arc utilizing equipment providing an output current nearly equal to an input current includes a first converter for converting an AC voltage to a DC voltage. The DC voltage is converted to a high frequency voltage by an inverter. The output of the inverter is converted through a second converter to a DC voltage which is applied between a torch and a workpiece. A current detector detects an output current flowing between the second converter and the workpiece. A voltage detector detects an output voltage between the torch and the workpiece. A multiplier multiplies the output current and the output voltage to provide a signal representative of an output power. A comparator compares the output power representative signal with a first preset value. A signal from the current detector is applied to an error amplifier when the output power representative signal is smaller than the first preset value, and, otherwise, the output power representative signal is applied to the error amplifier. The error amplifier controls the inverter such that the signal applied to the error amplifier can be equal to a second preset value set by a setting device.

16 Claims, 5 Drawing Sheets

POWER SUPPLY APPARATUS FOR PLASMA ARC UTILIZING EQUIPMENT

This application is based on Japanese Patent Application No. HEI 8-327642 filed on Nov. 22, 1996 which is incorporated herein by reference.

This invention relates to power supply apparatus for plasma arc utilizing equipment, e.g. a plasma arc cutter or a plasma arc welder, and for an arc-initiating apparatus for e.g. an arc-lamp for an overhead projector.

BACKGROUND OF THE INVENTION

Conventional power supply apparatus for plasma arc utilizing equipment, e.g. a plasma arc cutter or a plasma arc welder, typically has the following arrangement. A rectifier rectifies an AC voltage to generate a rectified voltage, which is converted into a high frequency voltage by a half-bridge inverter including capacitors and switching elements. The high frequency voltage is, then, voltage-transformed by a transformer. The transformed high frequency voltage is rectified by a second rectifier and, then, applied to a torch of the equipment and a workpiece to be wrought, so that arc is generated therebetween. A current detector detects current flowing between the torch and the workpiece during arcing, and provides a signal representative of the current. The current representative signal is applied to a control circuit for controlling the inverter. The control circuit controls switching elements of the inverter such that the current representative signal becomes equal to a signal representative of a preset current.

Such power supply apparatus has a low power factor because it employs a half-bridge inverter including capacitors. The power supply apparatus provides a high output voltage because it is controlled to provide a constant current, and, therefore, it provides a small output current relative to an input current applied thereto.

Accordingly, an object of the present invention is to provide power supply apparatus which can provide a large output current.

SUMMARY OF THE INVENTION

In accordance with a first aspect of the present invention, power supply apparatus includes first converting means, inverter means, second converting means, current detecting means, power detecting means, selecting means and control means. The first converting means converts an AC voltage to a DC voltage, which is, then, converted by the inverter means into a high frequency voltage. The second converting means converts the high frequency voltage from the inverter means to a DC voltage to apply it to a load. The current detecting means detects an output current of the second converting means to provide a detected-current representative signal. The power detecting means detects an output power of the second converting means to provide a detected-power representative signal. The selecting means receives the detected-current representative signal and the detected-power representative signal, and selects the detected-current representative signal when the power supplied to the load is smaller than a first preset value, and selects the detected-power representative signal when the power supplied to the load is larger than the first preset value. The control means controls the inverter means in such a manner as to make the selected one of the detected-current and detected-power representative signals equal to a second preset value.

The selecting means may compare the detected-power representative signal with the first preset value.

The power supply apparatus may further include input AC power detecting means for providing a signal representative of an input AC power supplied to the first converting means. The detected-AC-power representative signal is compared with the first preset value by the selecting means.

In accordance with a second aspect of the present invention, power supply apparatus includes first converting means, inverter means, second converting means, and current detecting means. All of these components operate similarly to those of the power supply apparatus according to the first aspect. The power supply apparatus according to the second aspect further includes voltage detecting means, subtracting means, selecting means, and control means. The voltage detecting means detects an output voltage of the second converting means to provide a detected-voltage representative signal. The subtracting means determines the difference between the detected-current representative signal from the current detecting means and the detected-voltage representative signal, to provide a signal representative of the difference. The detected-current representative signal and the difference representative signal are applied to the selecting means. The selecting means selects the detected-current representative signal when the difference representative signal is smaller than a first preset value, and selects the difference representative signal when it is larger than the first preset value. The control means controls the inverter means in such a manner as to make the selected one of the detected-current representative signal and the difference representative signal equal to a second preset value.

In the first and the second aspects of the present invention, the inverter means may be preceded by power factor improving means.

BRIEF DESCRIPTION OF THE DRAWINGS

Throughout the drawings, the same reference numerals denote similar components or functions.

DETAILED DESCRIPTION OF PREFERRED EMBODIMENTS

Figure 1:
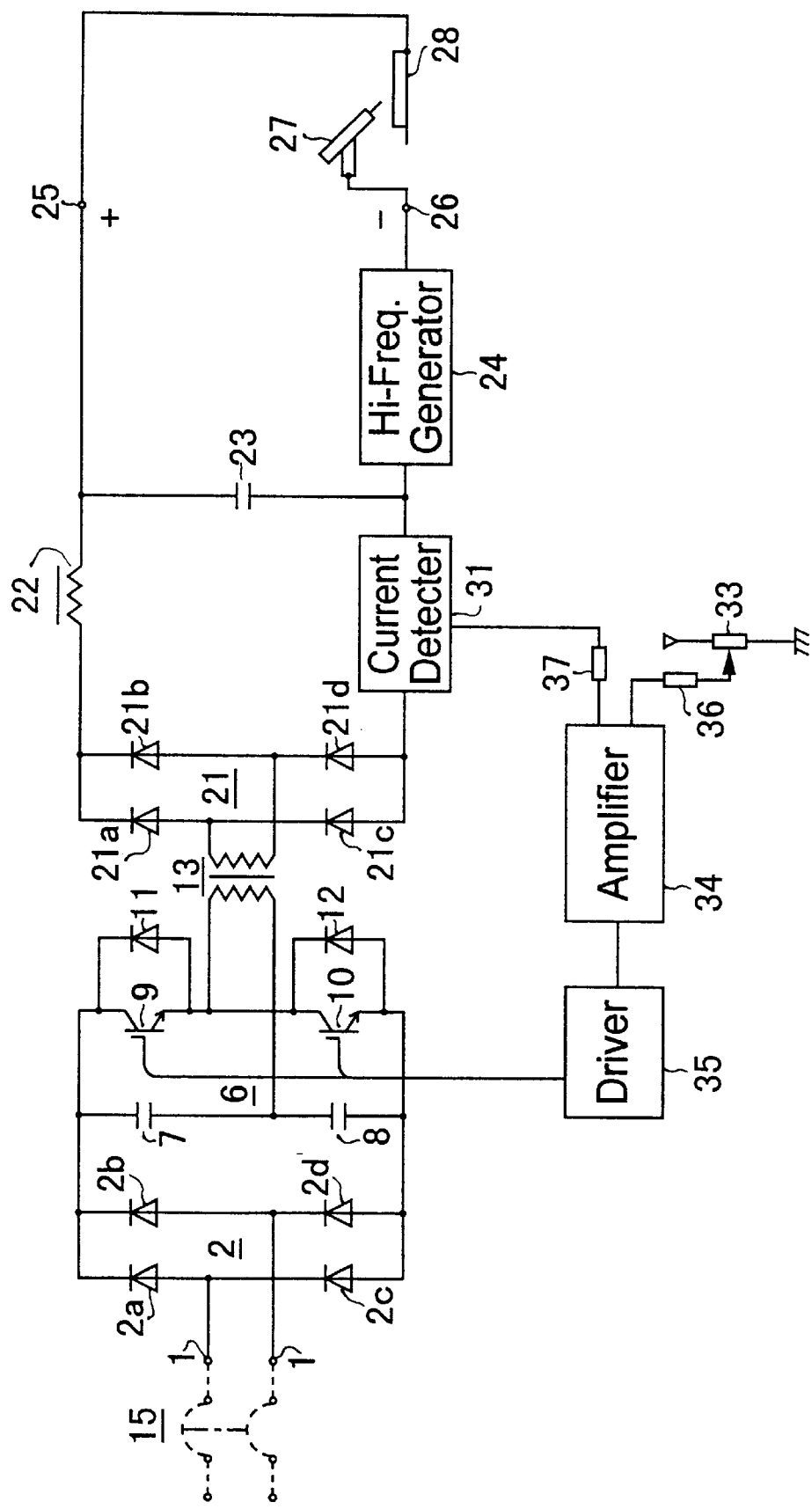
FIG. 1 is a block diagram of a prior art power supply apparatus used with a plasma arc cutter.

Before explaining the present invention, a prior art power supply apparatus is explained with reference to FIG. 1. FIG. 1 shows a prior art power supply apparatus used with a plasma arc cutter. An AC voltage is applied between input terminals 1, 1 and full-wave rectified by first converting means, e.g. a full-wave rectifier 2. The full-wave rectifier 2 includes diodes 2a-2d connected to form a bridge.

An output of the full-wave rectifier 2 is converted by inverter means, e.g. a half-bridge inverter 6, into a high frequency voltage having a frequency within a range of from e.g. 20 KHz to e.g. 100 KHz.

The inverter 6 includes capacitors 7 and 8, semiconductor switching elements, e.g. IGBTs 9 and 10, and flywheel diodes 11 and 12. The capacitors 7 and 8 are connected in series, and the IGBTs 9 and 10 are also connected in series. The series connections are connected in parallel. The output of the full-wave rectifier 2 is applied across the parallel combination. The diodes 11 and 12 are connected in back-to-back with the IGBT 9 and the IGBT 10, respectively. A high frequency transformer 13 is connected between the node between the capacitors 7 and 8 and the node between the IGBTs 9 and 10. The high frequency transformer 13 transforms the high frequency voltage from the inverter 6. The transformed high frequency voltage is full-wave rectified by second converting means, e.g. a full-wave rectifier 21, which has a bridge circuit of diodes 21a–21d. The full-wave rectified high frequency voltage is smoothed by a smoothing reactor 22, and then applied through a positive output terminal 25 and a negative output terminal 26 to a load comprising a torch 27 and a workpiece 28. The workpiece 28 is connected to the positive output terminal 25, and the torch 27 is connected to the negative output terminal 26.

There is a gap between the torch 27 and the workpiece 28. Therefore, arcing cannot be generated between the torch 27 and the workpiece 28 by applying the DC voltage alone between the output terminals 25 and 26. To initiate arcing, a high frequency generator 24 which generates a high frequency pulse voltage having the maximum of e.g. several kilovolts is used. The high frequency generator 24 is connected in series with a bypass capacitor 23 between the output terminals 25 and 26. The high frequency voltage generated by the high frequency generator 24 is applied between the torch 27 and the workpiece 28 and generates arc across the gap, so that current flows from the full-wave rectifier 21 to the load. The current sustains arcing. The bypass capacitor 23 serves to prevent current based on the high frequency voltage generated by the high frequency generating device 24 from flowing into the full-wave rectifier 21.

A current detector 31 detects the current flowing from the full-wave rectifier 21 to the load. A signal representative of the detected current is applied from the current detector 31 to an error amplifier 34 through a resistor 37. The error amplifier 34 receives a preset signal from a cutting-current value setting device 33 through a resistor 36. The preset signal represents a cutting-current value set by the setting device 33. The error amplifier 34 provides a signal representative of the difference between the detected-current representative signal from the current detector 31 and the preset cutting-current representative signal, and applies it to a drive circuit 35. The drive circuit 35 controls the IGBTs 9 and 10 of the inverter 6 by a pulse width modulation (PWM) technique in such a manner that the difference representative signal becomes zero, i.e. the cutting current is kept constant. Such control can provide stabilized cutting power to the plasma arc cutter and thus ensures good cutting even when the torch 27 is removed away from the workpiece 28.

The above-described power supply apparatus for the plasma arc cutter has a nominal power factor of from 0.5 to 0.6 because it uses the capacitors 7 and 8. The plasma arc cutter power supply apparatus may include a breaker or fuse 15 coupled to the input terminals 1, 1. The fuse 15 allows a maximum of 15A of current to flow. Assuming that the input AC voltage is 115V, the input current is 15A, the power factor is 0.6, and the plasma arc cutter has an efficiency of 85%, the output power P of the plasma arc cutter is calculated as follows.

$$P=115\times15\times0.85\times0.6 =880 \tag{1}$$

Such plasma arc cutter can provide an output voltage of only 120V, for example, because of its characteristics. Thus, the cutting current I is calculated as follows.

$$I=880/120=7.3 \tag{2}$$

As is seen from the expression 2, the prior art power supply apparatus cannot provide large output current for the input current applied thereto.

Figure 2:
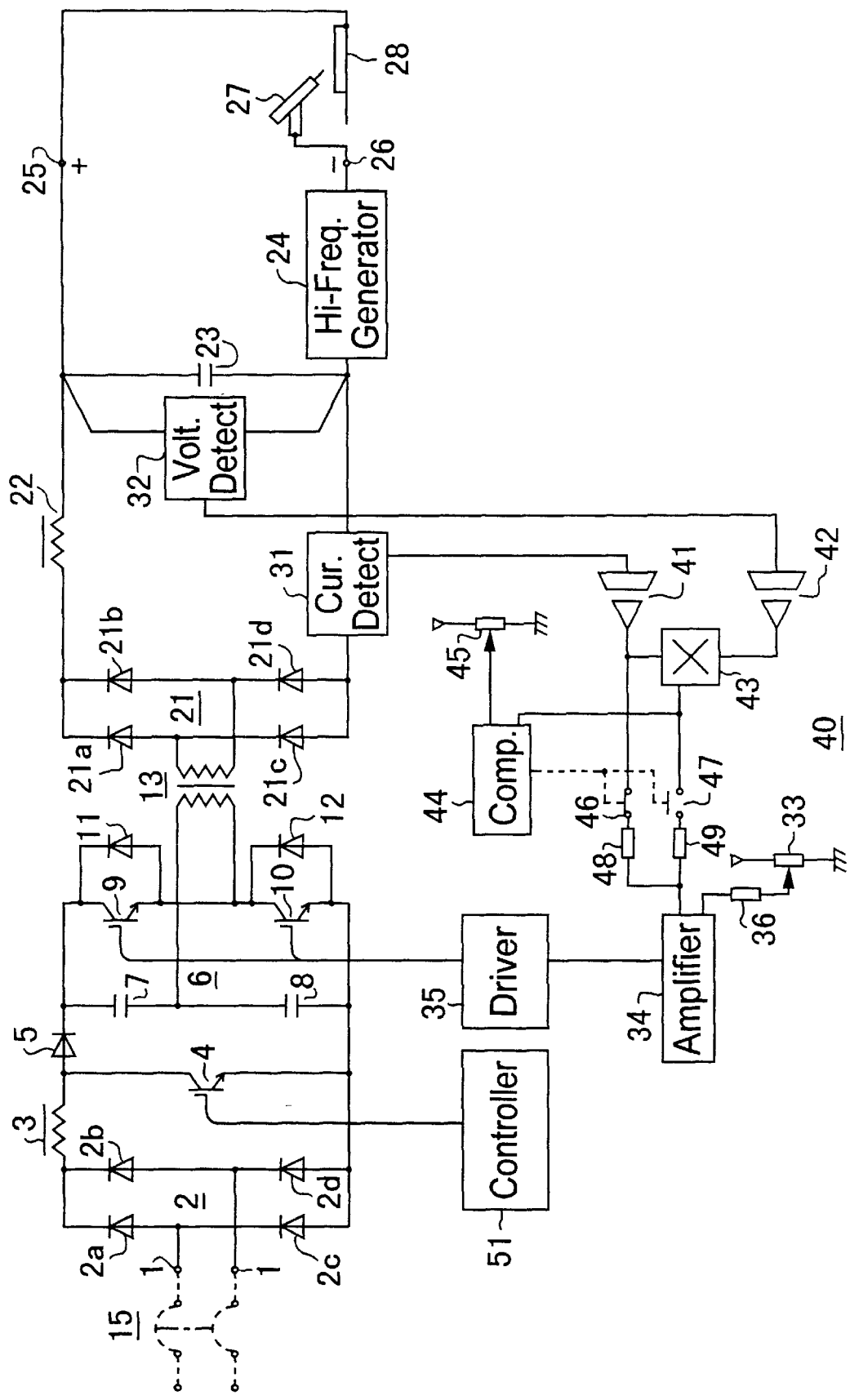
FIG. 2 is a block diagram of power supply apparatus according to a first embodiment of the present invention used with a plasma arc cutter.

FIG. 2 is a block diagram of a power supply apparatus according to a first embodiment of the present invention used with a plasma arc cutter. The power supply apparatus shown in FIG. 2 has a similar arrangement to the one shown in FIG. 1, except the later-mentioned features, and those components which are used in both power supply apparatuses operate in the same manner. Thus, the same reference numerals and symbols as used in FIG. 1 are used for similar components and functions of the power supply apparatus of FIG. 2, and their detailed descriptions are not given.

The power supply apparatus of FIG. 2 differs from that of FIG. 1 in that a power factor improving circuit is disposed between the full-wave rectifier 2 and the inverter 6. The power factor improving circuit is a PWM-controlled regenerative converter. The PWM-controlled regenerative converter detects an output voltage thereof and compares it with a reference voltage. The difference between the converter output voltage and the reference voltage is multiplied by an input AC voltage to the power supply apparatus, and the difference in phase between the resulting product and an input AC current to the power supply apparatus is determined. The phase difference is controlled to be zero by a controller included in the converter, so that the power factor of substantially equal to unity is provided.

Specifically, the power factor improving circuit includes a smoothing reactor 3, a semiconductor switching element 4, a reverse-current blocking diode 5, and a controller 51. The reactor 3 is coupled to the output of the full-wave rectifier 2. An output current of the smoothing reactor 3 is alternately coupled and decoupled to and from ground at a high switching frequency by a semiconductor switching element 4 such as IGBT. The reverse-current blocking diode 5 is coupled to the output of the smoothing reactor 3. The controller 51 controls the semiconductor switching element 4. The controller 51 receives signals from a detector (not shown) which detects an input current applied to the switching element 4 and a detector (not shown) which detects an input voltage applied to the switching element 4. The controller 51 opens and closes the switching element 4 such that the phase of the input current to the switching element 4 can coincide with that of the input voltage, whereby a power factor substantially equal to 1 is provided. The arrangement of the controller 51 is not described in detail herein because it is well-known.

Second, the power supply apparatus of FIG. 2 differs from that of FIG. 1 also in that it includes a switching command circuit 40. The switching command circuit 40 includes a voltage detector 32 which detects a voltage between the output terminals 25 and 26 and provides a signal representative of the detected voltage. The detected-voltage representative signal from the detector 32 is amplified by an isolation amplifier 42 having its input and output isolated from each other, and applied to a multiplier 43. The detected-current representative signal provided by the current detector 31, which is representative of the current flowing from the rectifier 21 to the load, is amplified by an isolation amplifier 41 and applied to the multiplier 43. Thus, an output signal of the multiplier 43 represents power supplied to the load, i.e. the torch 27 and the workpiece 28.

The current detector 31, the voltage detector 32, the isolation amplifiers 41 and 42, and the multiplier 43 constitute power detecting means.

The output signal of the multiplier 43 is applied to a comparator 44. The comparator 44 is also provided with a first preset-value representative signal, e.g. a preset switching-level representative signal, provided by a switching-level setting device 45. The comparator 44 compares the output signal of the multiplier 43 with the preset switching-level representative signal and provides an output signal related to the result of the comparison.

The output of the isolation amplifier 41 is coupled via a switch 46 and a resistor 48 to the error amplifier 34. The output of the multiplier 43 is also coupled via a switch 47 and a resistor 49 to the error amplifier 34. The comparator 44 controls the switches 46 and 47 in such a manner that the switch 47 is closed and the switch 46 is opened when the output signal of the multiplier 43 is larger than the preset switching-level representative signal, and the switch 47 is opened and the switch 46 is closed when the output signal of the multiplier 43 is smaller than the preset switching-level representative signal.

Thus, the comparator 44 and the switches 46 and 47 of the switching command circuit 40 form selecting means for selecting one of the outputs of the isolation amplifier 41 and the multiplier 43. The error amplifier 34 and the drive circuit 35 form inverter control means which controls the inverter 6.

In the power supply apparatus having the arrangement described above, because of the power factor improving circuit, power having a power factor substantially equal to unity is supplied to the inverter 6. A DC voltage is developed between the output terminals 25 and 26, which is applied between the torch 27 and the workpiece 28. With this DC voltage alone, however, arc cannot be generated because of the gap between the torch 27 and the workpiece 28. The high frequency generator 24 initiates arcing between the torch 27 and the workpiece 28, as previously described with reference to FIG. 1. The arcing is sustained by the current, i.e. cutting current, flowing from the output terminal 25 to the output terminal 26.

The comparator 44 compares the output of the multiplier 43 (i.e. a signal representative of the power supplied to the torch 27 and the workpiece 28) with the preset switching-level representative signal from the switching-level setting device 45. When the cutting current is large and the output voltage developed between the output terminals 25 and 26 is low, the output signal of the multiplier 43 is smaller than the preset switching-level representative signal. Thus, the comparator 44 closes the switch 46 and opens the switch 47, as shown in FIG. 2, so that the output signal of the isolation amplifier 41 (representative of the cutting current) is applied to the error amplifier 34. The error amplifier 34 develops a signal representative of the difference between a preset cutting-current representative signal from the cutting-current value setting device 33 and the output signal of the isolation amplifier 41, and the difference representative signal is applied to the drive circuit 35. The drive circuit 35 controls the conduction periods of the IGBTs 9 and 10 of the inverter 6, in such a way that the difference representative signal can be zero. Thus, the constant-current control is provided as represented by a portion A of the characteristic curve shown in FIG. 3 so that the current flowing between the torch 27 and the workpiece 28 can be equal to a value determined by the preset cutting-current representative signal.

With large cutting current and high output voltage, the output signal of the multiplier 43 is larger than the preset switching-level representative signal. Thus, the comparator 44 opens the switch 46 and closes the switch 47, so that the output of the multiplier 43 is applied to the error amplifier 34. The error amplifier 34 provides a signal representative of the difference between the output of the multiplier 43 and the preset cutting-current representative signal, and applies it to the drive circuit 35. The drive circuit 35 controls the conduction periods of the IGBTs 9 and 10 of the inverter 6, in such a way that the difference representative signal can be zero. Thus, the constant-power control is provided as represented by a portion B of the characteristic curve shown in FIG. 3 so that the power supplied to the torch 27 and the workpiece 28 can be equal to a value determined by the preset cutting-current representative signal.

Figure 3:
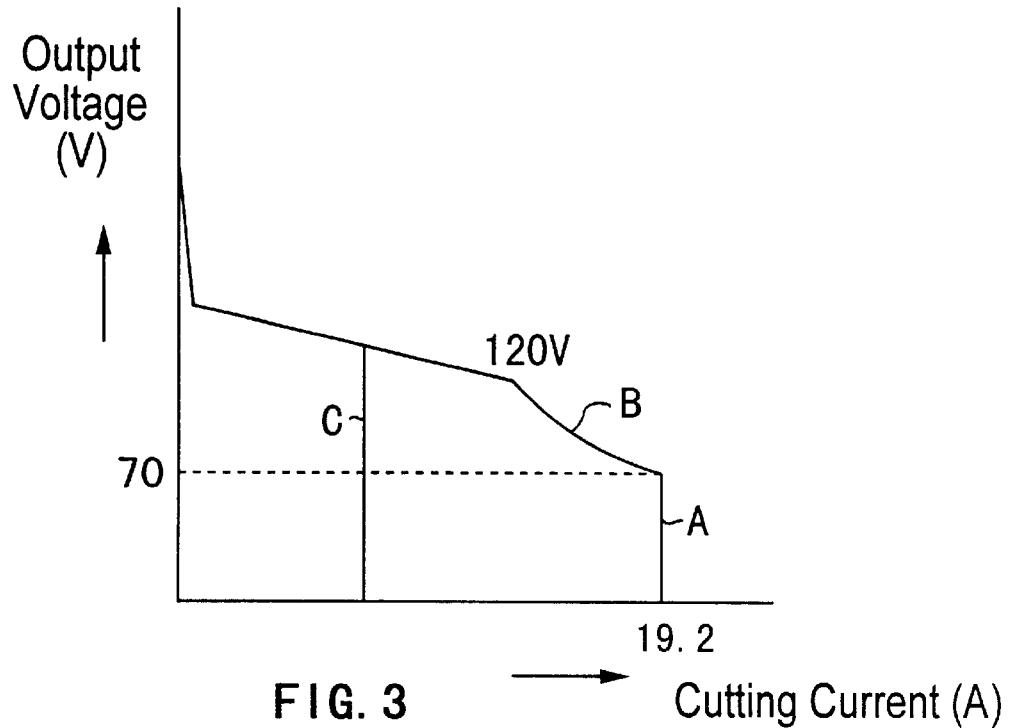
FIG. 3 shows an output characteristic of the power supply apparatus of FIG. 2.
Figure 6:
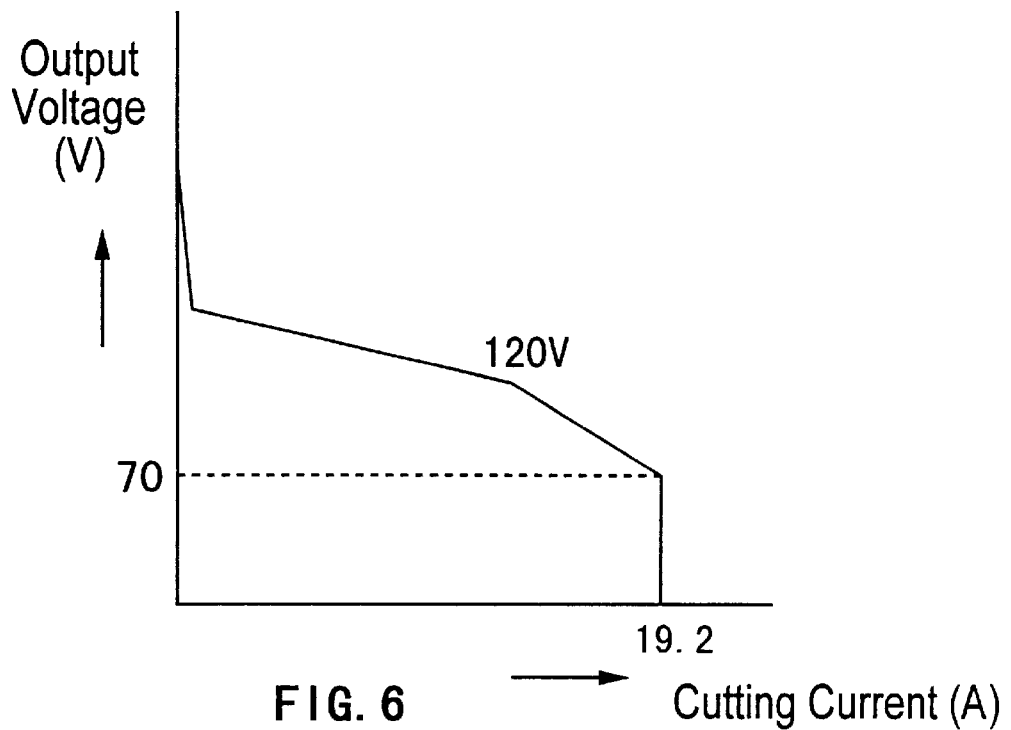
FIG. 6 shows an output characteristic of the power supply apparatus of FIG. 5.

As shown in FIG. 3, stable constant-current control is provided under the large cutting current and low output voltage condition, i.e. when the torch 27 is located close to the workpiece 28. When the torch 27 is moved away from the workpiece 28, which results in large cutting current and high output voltage, constant-power control is provided. If the cutting-current representative signal is preset to a small value by the cutting-current value setting device 33, constant-current control is provided as represented by a portion C shown in FIG. 3.

The power supply apparatus of the present invention thus far described has a power factor close to 1, e.g. 0.98, because it includes the power factor improving circuit. The power factor improving circuit can provide the plasma arc cutter with an efficiency of e.g. 80%. Assuming that the input voltage is 115V and the input current is 15A, the plasma arc cutter can have a maximum output capacity of P which is calculated as follows.

$$P=115 \times 15 \times 0.98 \times 0.80=1350 \tag{3}$$

According to the loading characteristic shown in FIG. 3, the output voltage is 70V when cutting current is large. (The power supply apparatus of the present invention provides a lower output voltage than the prior art one because the constant-power control is provided prior to the constant-current control.) The cutting current can have a large value, which is calculated as follows.

$$I=1350/70=19.2 \tag{4}$$

Such large cutting current results in high cutting rate and thus low output voltage. Thus, the plasma arc cutter can cut a workpiece even if the output power is below the rated value.

The power factor improving circuit may be omitted from the power supply apparatus of the present invention. The power supply apparatus of FIG. 2 with no power factor improving circuit has a power factor of e.g. 0.6 because its inverter 6 is of a capacitor-input type and thus the charging and discharging currents of the capacitors 7 and 8 are large. Assuming that the input voltage to such power supply apparatus is 115V, the input current is 15A, the efficiency of the plasma arc cutter is 0.85, and the power factor is 0.6, the output capacity P is calculated as follows, which is the same as that of the prior art plasma arc cutter.

$$P=115 \times 15 \times 0.85 \times 0.6=880 \tag{5}$$

The output voltage, however, can be reduced to 70V because of the constant-power control. The cutting current is calculated by the following expression (6).

$$880/70=12.6 \tag{6}$$

As is seen, the cutting current can be larger than that of the plasma arc cutter with which the prior art power supply apparatus is used, and the cutting power is increased accordingly. From this, it is understood that the cutting power can be improved by the use of combination of the constant-power control and the constant-current control even if the power factor improving circuit is not used.

Figure 4:
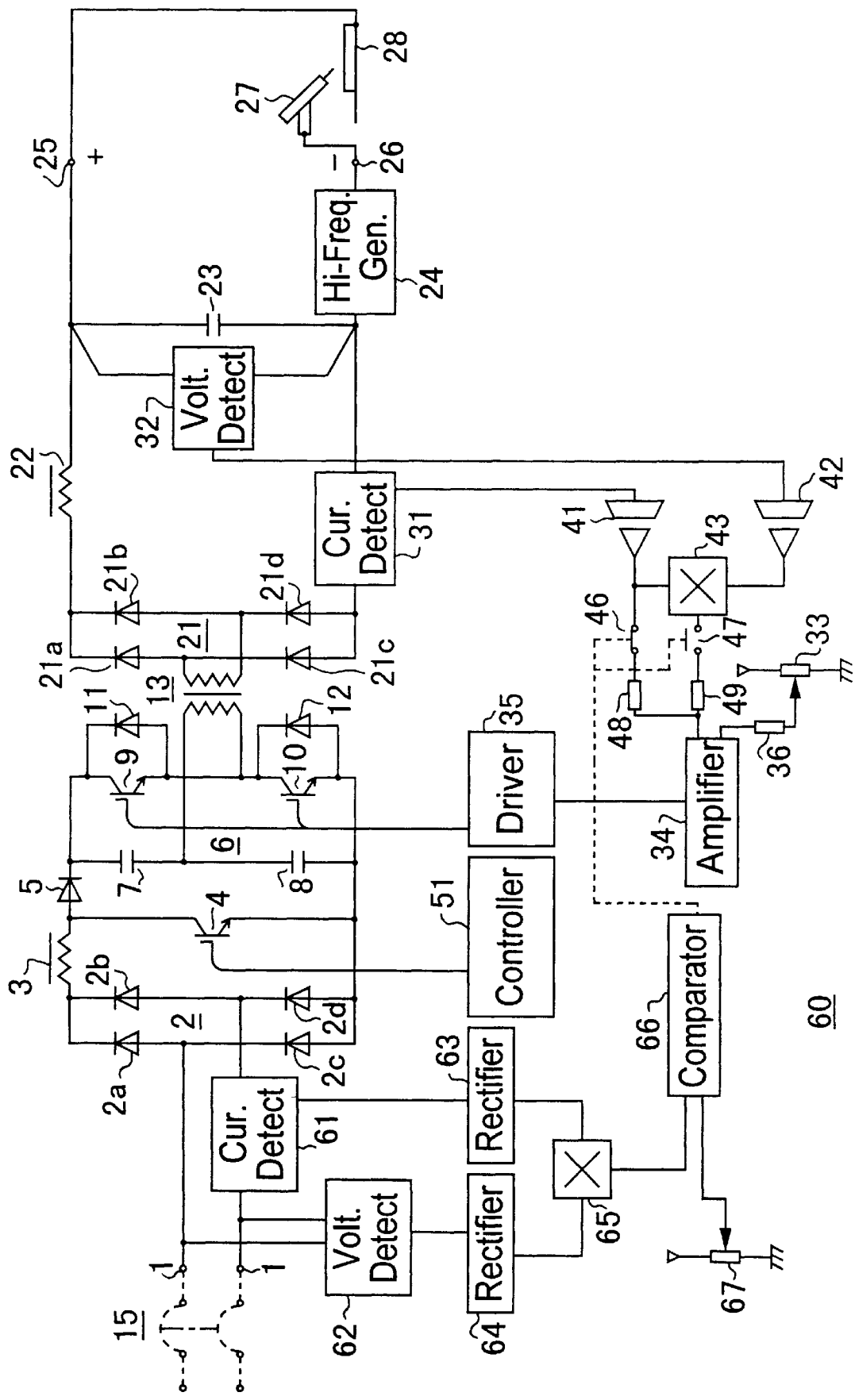
FIG. 4 is a block diagram of power supply apparatus according to a second embodiment of the present invention used with a plasma arc cutter.

FIG. 4 shows a circuit arrangement of a power supply apparatus according to a second embodiment of the present invention used with a plasma arc cutter. The power supply apparatus shown in FIG. 4 has a similar arrangement to the ones shown in FIGS. 1 and 2, except the later-mentioned features. Thus, the same reference numerals and symbols as used in FIGS. 1 and 2 are used for similar components and functions of the power supply apparatus of FIG. 4, and their detailed descriptions are not given.

In the second embodiment, the input voltage is detected and compared with a preset switching-level representative signal while, in the first embodiment, the output voltage is detected and compared with a preset switching-level representative signal.

The second embodiment includes a switching command circuit 60 in which an input AC current is detected by isolation detection by a current detector 61 and rectified by a rectifying circuit 63. Also, an input AC voltage is detected by isolation detection by a voltage detector 62 and rectified by a rectifying circuit 64. Detection intended by the term "isolation detection" used herein is such that detection of current or voltage by the detector gives little influence on circuitry succeeding the detector. The detector may comprise, for example, a photocoupler.

A multiplier 65 multiplies detected-current and detected-voltage representative signals from the rectifying circuits 63 and 64 to calculate an input power. The output signal of the multiplier 65 is compared by a comparator 66 with a preset switching-level representative signal from a switching-level setting device 67. The output of the comparator 66 controls the switches 46 and 47. The comparator 66 closes the switch 46 and opens the switch 47, as shown in FIG. 4, when the output signal of the multiplier 65 is smaller than the preset switching-level representative signal, and opens the switch 46 and closes the switch 47 when the output signal of the multiplier 65 is larger than the preset switching-level representative signal. Otherwise, the operation and functions of the power supply apparatus shown in FIG. 4 are similar to those of the first embodiment shown in FIG. 2.

Figure 5:
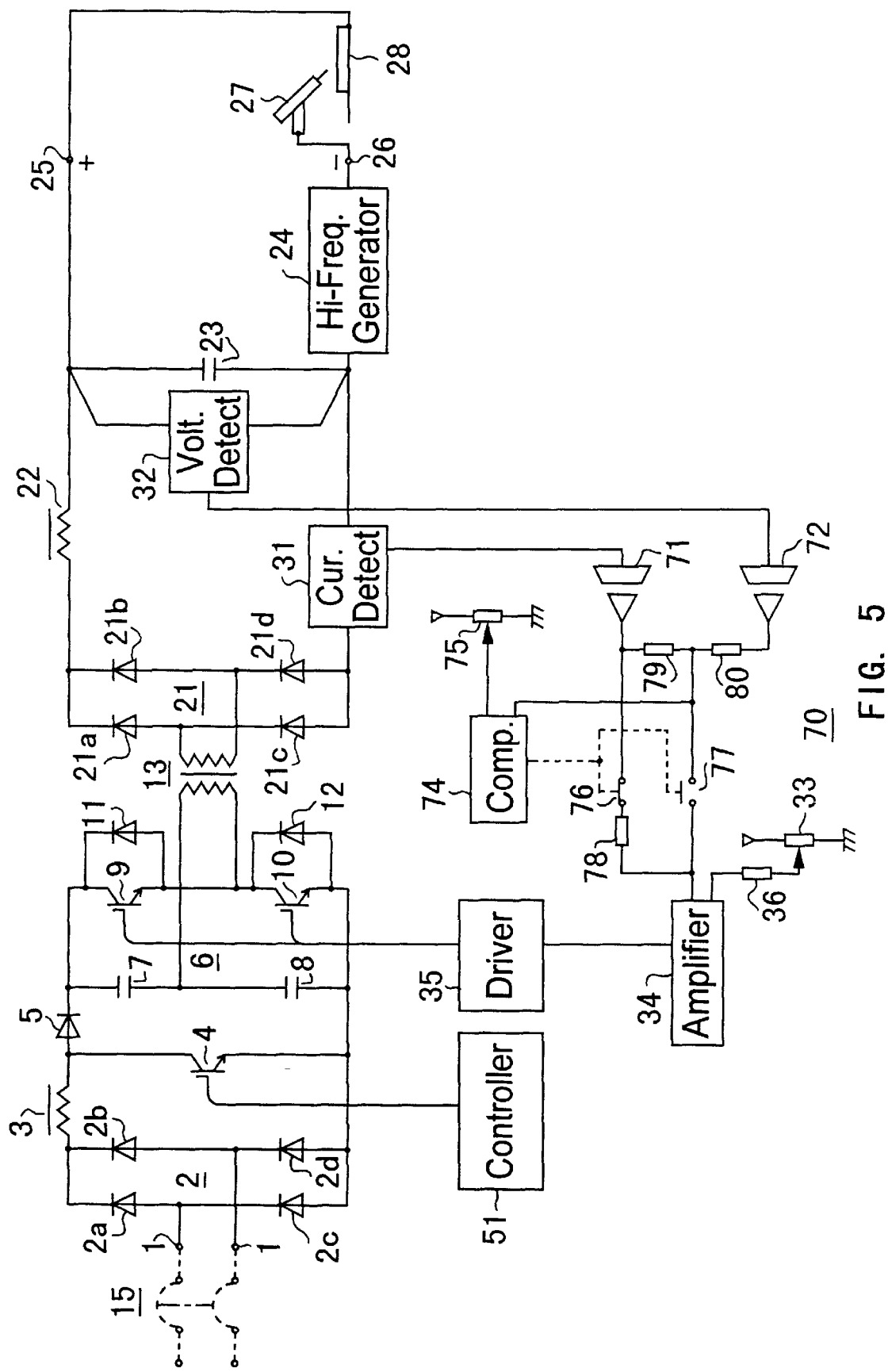
FIG. 5 is a block diagram of power supply apparatus according to a third embodiment of the present invention used with a plasma arc cutter.

FIG. 5 shows a circuit arrangement of a power supply apparatus according to a third embodiment of the present invention used with a plasma arc cutter. The power supply apparatus shown in FIG. 5 has a similar arrangement to the ones shown in FIGS. 1, 2 and 4, except the later-mentioned features. Thus, the same reference numerals and symbols as used in FIGS. 1, 2 and 4 are used for similar components and functions of the power supply apparatus of FIG. 5, and their detailed descriptions are not given.

As described previously, in the first embodiment, the current detector 31 detects cutting current, the voltage detector 32 detects an output voltage and the power supplied to the load is calculated by multiplying the detected-current and detected-voltage representative signals from the detectors 31 and 32, respectively. In the third embodiment, an isolation amplifier 71 of a switching command circuit 70 amplifies a detected-current representative signal provided by the current detector 31 and an isolation amplifier 72 amplifies a detected-voltage representative signal provided by the voltage detector 32. Resistors 79 and 80 are used for subtracting the amplified detected-voltage representative signal from the amplified detected-current representative signal. Then, the result of the subtraction is compared by a comparator 74 with a preset switching-level representative signal of a switching-level setting device 75.

The comparator 74 applies the subtraction result to the error amplifier 34 by closing a switch 77 and opening a switch 76 when the cutting current is large and the output voltage is high. The comparator 74 applies the output signal of the insolation amplifier 71 to the error amplifier 34 through a resistor 78, as shown in FIG. 5, when large cutting current and low output voltage are provided. Otherwise, the operation and functions are similar to those of the first embodiment, except that the output characteristic presented when the subtraction result is applied to the error amplifier 34 is not a constant-power control characteristic, but a drooping characteristic approximating the constant-power characteristic.

In the above-stated embodiments, the power factor improving circuit is coupled in the output of the full-wave rectifier 2. However, the reactor 3 of the power factor improving circuit may be disposed in the AC input line.

The power supply apparatus of the present invention may be used with other plasma arc utilizing equipment such as a plasma arc welder and an arc-initiating apparatus for an arc-lamp for an overhead projector, in addition to a plasma arc cutter as stated above.

What is claimed is:

1. Power supply apparatus comprising:

first converting means for converting an AC voltage to a DC voltage;

inverter means for converting said DC voltage to a high frequency voltage;

second converting means for converting an output voltage of said inverter means to a DC voltage for application to a load, said load comprising a torch and a workpiece, voltage and current demanded by the load varying in accordance with the distance between the torch and the workpiece;

current detecting means for detecting an output current of said second converting means and providing a detected-current representative signal;

power detecting means for detecting an output power of said second converting means and providing a detected-power representative signal;

selecting means receiving said detected-current representative signal and said detected-power representative signal for selecting said detected-current representative signal when the power supplied to said load is smaller than a first preset value, and selecting said detected-power representative signal when the power supplied to said load is larger than said first preset value; and control means for controlling said inverter means such that the selected one of said detected-current representative signal and said detected-power representative signal can be equal to a second preset value.

2. The power supply apparatus according to claim 1 wherein said selecting means compares said detected-power representative signal with said first preset value.

3. The power supply apparatus according to claim 1 further comprising means for detecting an AC power supplied to said first converting means, said selecting means comparing an output signal of said AC power detecting means with the first preset value.

4. Power supply apparatus comprising:

first converting means for converting an AC voltage to a DC voltage;

inverter means for converting said DC voltage to a high frequency voltage;

second converting means for converting an output voltage of said inverter means to a DC voltage for application to a load, said load comprising a torch and a workpiece, voltage and current demanded by the load varying in accordance with the distance between the torch and the workpiece;

current detecting means for detecting an output current of said second converting means and providing a detected-current representative signal;

voltage detecting means for detecting an output voltage of said second converting means and providing a detected-voltage representative signal;

subtracting means for determining the difference between said detected-current representative signal and said detected-voltage representative signal;

selecting means receiving said detected-current representative signal and an output signal of said subtracting means for selecting said detected-current representative signal when said output signal of said subtracting means is smaller than a first preset value, and selecting the output signal of said subtracting means when it is larger than the first preset value; and control means for controlling said inverter means such that the selected one of said detected-current representative signal and said output signal of said subtracting means can be equal to a second preset value.

5. The power supply apparatus according to claim 1 wherein said inverter means is preceded by power factor improving means.

6. The power supply apparatus according to claim 2 wherein said inverter means is preceded by power factor improving means.

7. The power supply apparatus according to claim 3 wherein said inverter means is preceded by power factor improving means.

8. The power supply apparatus according to claim 4 wherein said inverter means is preceded by power factor improving means.

9. Power supply apparatus comprising:

a first converter for converting an AC voltage to a DC voltage;

an inverter for converting said DC voltage to a high frequency voltage;

a second converter for converting an output voltage of said inverter to a DC voltage for application to a load, said load comprising a torch and a workpiece, voltage and current demanded by the load varying in accordance with the distance between the torch and the workpiece;

a current detector for detecting an output current of said second converter and providing a detected-current representative signal;

a power detector for detecting an output power of said second converter and providing a detected-power representative signal;

a selector receiving said detected-current representative signal and said detected-power representative signal for selecting said detected-current representative signal for selecting said detected-current representative signal when the power supplied to said load is smaller than a first preset value, and selecting said detected-power representative signal when the power supplied to said load is larger than said first preset value; and a controller for controlling said inverter such that the selected one of said detected-current representative signal and said detected-power representative signal can be equal to a second preset value.

10. The power supply apparatus according to claim 9 wherein said selector compares said detected-power representative signal with said first preset value.

11. The power supply apparatus according to claim 9 further comprising an AC power detector for detecting an AC power supplied to said first converter, said selector comparing an output signal of said AC power detector with the first preset value.

12. Power supply apparatus comprising:

a first converter for converting an AC voltage to a DC voltage;

an inverter for converting said DC voltage to a high frequency voltage;

a second converter for converting an output voltage of said inverter to a DC voltage for application to a load, said load comprising a torch and a workpiece voltage and current demanded by the load varying in accordance with the distance between the torch and the workpiece;

a current detector for detecting an output current of said second converter and providing a detected-current representative signal;

a voltage detector for detecting an output voltage of said second converter and providing a detected-voltage representative signal;

a subtracter for determining the difference between said detected-current representative signal and said detected-voltage representative signal;

a selector receiving said detected-current representative signal and an output signal of said subtracter for selecting said detected-current representative signal when said output signal of said subtracter is smaller than a first preset value, and selecting said output signal of said subtracter when it is larger than the first preset value; and a controller for controlling said inverter such that the selected one of said detected-current representative signal and said output signal of said subtracter can be equal to a second preset value.

13. The power supply apparatus according to claim 9 wherein said inverter is preceded by a power factor improving circuit.

14. The power supply apparatus according to claim 10 wherein said inverter is preceded by a power factor improving circuit.

15. The power supply apparatus according to claim 11 wherein said inverter is preceded by a power factor improving circuit.

16. The power supply apparatus according to claim 12 wherein said inverter is preceded by a power factor improving circuit.

* * * * *